Feb. 9, 1965 E. W. RADTKE ETAL 3,169,183

OPTICAL VIEWING SYSTEM FOR ELECTRON BEAM MACHINE

Filed Oct. 17, 1962 2 Sheets-Sheet 1

INVENTORS
EDWARD W. RADTKE
CHARLES F. STEARNS
PHILIP E. BARNES

BY
ATTORNEY

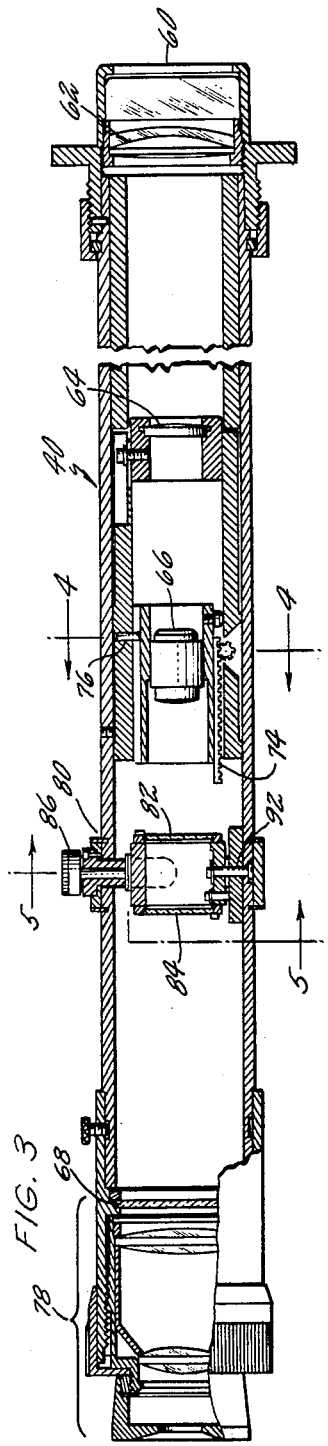
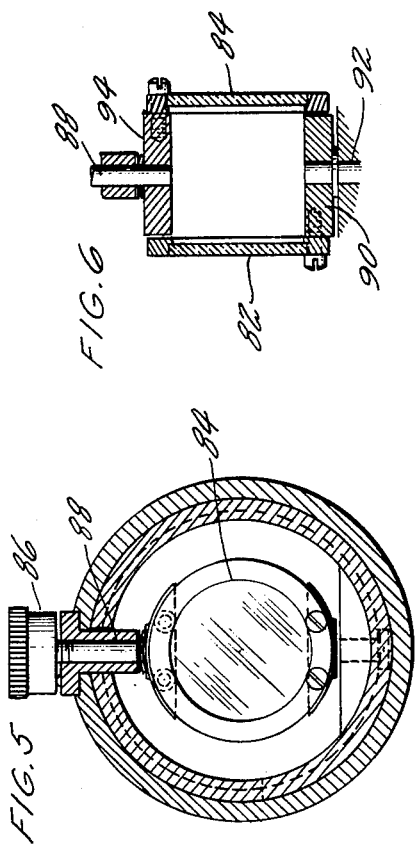
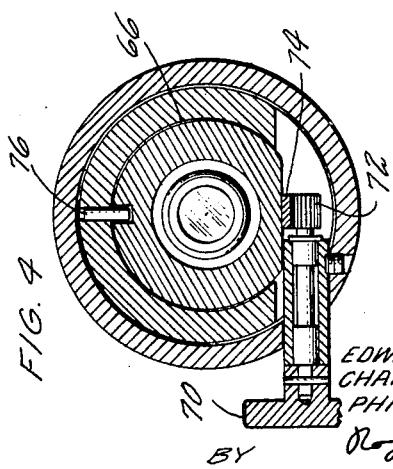

3,169,183
OPTICAL VIEWING SYSTEM FOR ELECTRON
BEAM MACHINE
Edward W. Radtke, Bloomfield, Conn., Charles F. Stearns, East Longmeadow, Mass., and Philip E. Barnes, Granby, Conn., assignors to United Aircraft Corporation, East Hartford, Conn., a corporation of Delaware
Filed Oct. 17, 1962, Ser. No. 231,189
14 Claims. (Cl. 219—121)

Our invention relates to working materials with a highly energized beam. More particularly, our invention relates to an optical viewing system through which the material being worked with such a beam is observable during operation of the beam generator.

While our invention may be used with devices such as lasers, it has particular utility when used with an electron beam machine. Electron beam machines, as they are generally known, are devices which use the kinetic energy of an electron beam to work a material. U.S. Patent No. 2,793,281, issued May 21, 1957, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the work piece generates higher lattice vibrations which causes an increase in the temperature within the impingement area sufficient to accomplish work. In fact, the temperature becomes so high that the material melts and even vaporizes. This vaporization, in turn, permits deep penetration of the work piece by the beam. That is, deep penetration can only be achieved by vaporization of a fine channel in the material.

In performing work with an electron beam, it is desirable and often necessary to visually observe the material being worked. This may be accomplished by providing a leaded glass viewing port in the side of the electron beam machine's vacuum chamber or, in machines where high precision is desired, by providing an optical system including means for magnifying the image of the area being worked. Prior art machines which utilized the optical system approach positioned an objective lens, apertured for passage of the beam, along the beam axis. By use of mirrors, the image passed by this lens was reflected through a viewing port and thence to the operator through an image magnifying means. This location of the objective lens along the beam axis is undesirable since apertured lenses are comparatively expensive and vapors emanating from the work piece tend to condense on the lens thereby clouding it up and thus interfering with viewing. Also, where a high energy beam is utilized, X-rays will be generated by the impingement of the electrons in the beam on the work piece. Unlike vapors emanating from the work piece, X-rays cannot be blocked from the objective lens by means such as a protective glass and they thus impinge upon both the lens and the mirrors. As is well known, X-ray bombardment causes discoloration of glass and thus seriously limits the useful life of the lenses and mirrors. In prior art machines, focusing of the optical system was usually achieved by providing complicated gearing arrangements for moving the objective lens inside the evacuated column vertically along the beam axis. Mechanical considerations limit the range of this movement and thus limit the available focal range. This is a serious defficiency since the beam, in an electron beam machine, may be focused over a vertical range in excess of one foot in working irregularly shaped pieces. Another disadvantage of the prior art viewing systems is that they utilize a light source which shines through the objective lens to illuminate the work area. This type of lighting results in a "washed-out" image.

Our invention overcomes the above stated disadvantages of the prior art by providing a novel optical viewing system for a device which works a material with a highly energized beam.

It is, therefore, an object of our invention to provide an improved optical viewing system for a machine which employs a highly energized beam to work a material.

It is another object of our invention ot prevent the discoloration or coating of the objective lens and mirrors of the means through which a material being worked with a highly energized beam is viewed.

It is also an object of our invention to provide an improved optical viewing system for an electron beam machine.

It is a further object of our invention to provide less expensive apparatus than previously available to accomplsh the other objects of our invention.

These and other objects of our invention are accomplished by placing the objective lens of the optical viewing system of a beam generator adjacent to rather than aligned with beam axis and utilizing a novel arrangement of highly polished metal mirrors to reflect a right side up image of the area being worked with the beam to said objective lens. The position of the objective lens is fixed and, between said lens and the viewing station, a collector lens and a movable erector assembly are located. This arrangement of lenses and movable erector permits much longer focal ranges than available in prior art machines. Another feature of our invention resides in the positioning of the viewing light which illuminates the area being worked such that this light does not shine through the objective lens thereby giving a washed-out image.

Our invention may be better understood and its numerous advantages will become apparent to those skilled in the art by reference to the accompanying drawing wherein like reference numerals refer to like elements in the various figures and in which:

FIGURE 3 is a cut-away view of the optical column which is used with the machine of FIGURE 1.

FIGURE 4 is a view along line 4—4 of FIGURE 3.

FIGURE 5 is a view along line 5—5 of FIGURE 3.

FIGURE 6 is a schematic side view of device of FIGURE 5.

Figure 1:
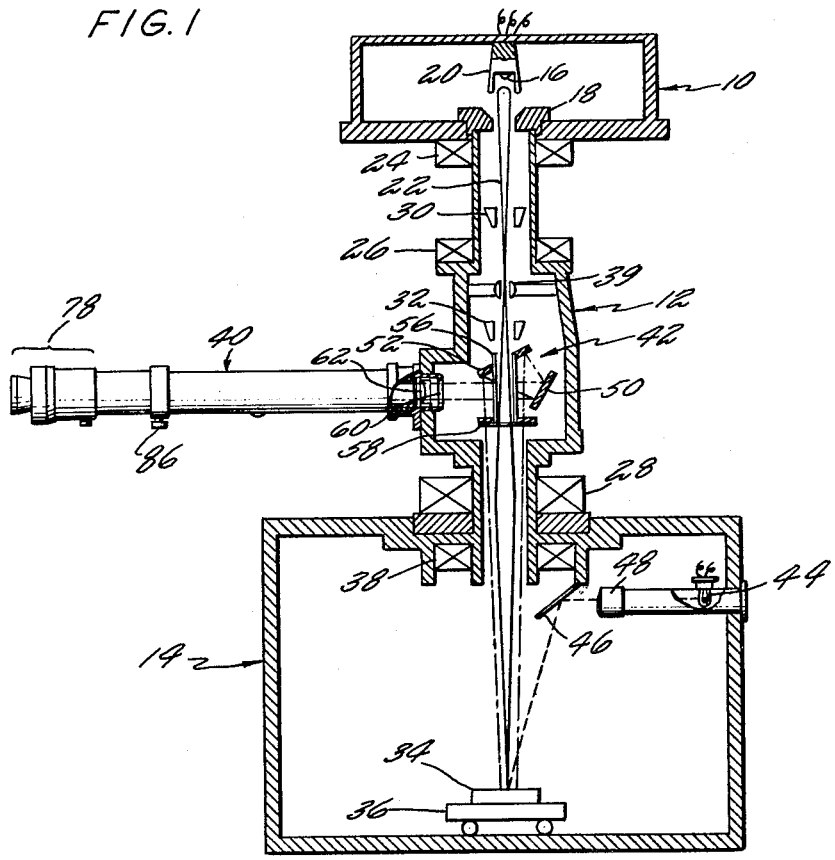
FIGURE 1 is a schematic view of an electron beam machine incorporating the optical viewing system of our invention.

Referring now to FIGURE 1, an electron beam machine is shown having an electron gun chamber 10, a beam focusing column 12 and a work chamber 14. The entire machine is normally maintained under a high vacuum by vacuum pumps, not shown. Inside electron gun chamber 10 there is a directly heated cathode 16 for emitting electrons which are accelerated down column 12 by a difference in potential between cathode 16 and grounded anode 18. Surrounding cathode 16 is a grid cup 20 which is biased at a voltage which is more negative than the voltage applied to cathode 16. The magnitude of this bias controls the beam current and, due to the shape of the grid, also aids in the focusing of the beam. The electrons which are accelerated down column 12 are focused into a narrow beam, indicated by reference numeral 22, by upper adjusting coil 24, lower adjusting coil 26, magnetic lens assembly 28 and upper and lower diaphragms 30 and 32. The focused beam 22 passes into work chamber 14 where it impinges upon the work piece 34 and, consequently, gives up its kinetic energy in the form of heat. The work piece 34 may be moved beneath the beam by a movable table 36 and the beam may be deflected over limited areas of the work piece by means of varying the current to magnetic deflection coils 38. In order to prevent contaminaiton of the cathode 16, a valve 39 is provided in column 12 to seal off and thus maintain a vacuum in gun chamber 10 when a new work piece is being inserted in the machine.

The work piece is observed visually through an optical viewing system comprising an optical viewing column 40 and a mirror assembly 42. The area to be viewed is illuminated by a light source assembly which, in the embodiment of FIGURE 1, is shown located in work chamber 14. The light source assembly comprises a viewing lamp 44, a 45° polished metal mirror 46 and a lens 48 for focusing the light from the lamp 44 on the work piece 34 via the mirror 46. The light source assembly is initially adjustable so as to illuminate a large area of the work piece thereby eliminating a need for means to change the position or focus of the light source. The illuminated image of the work area is transmitted up beam column 12 where it is reflected 90° by mirror assembly 42. The reflected image is then focused and magnified in optical column 40.

Figure 2:
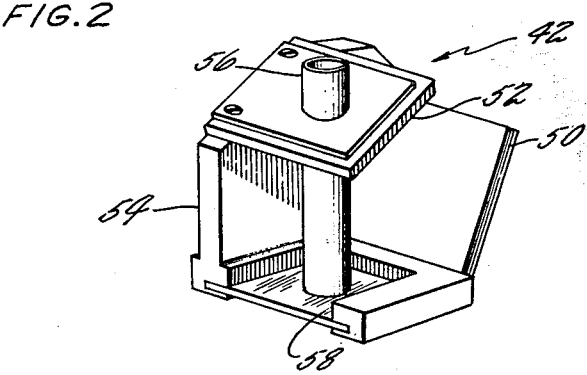
FIGURE 2 is a view of the mirror assembly which is located along the beam axis of the machine of FIGURE 1.

Referring now to FIGURE 2, there is shown in enlarged view of mirror assembly 42. This assembly comprises a pair of highly polished steel mirrors 50 and 52 securely attached to a frame 54. The mirrors 50 and 52 are precisely located relative to one another so as to perform the function of a penta-prism. By use of this arrangement, which we call a penta-plate, the image of the work piece is turned 90° and is reflected to optical column 40 without being inverted. Since mirrors 50 and 52 are metallic, X-rays emanating from work piece 34 will not cause their discoloration. As is apparent from FIGURES 1 and 2, means are provided so that the beam of charged particles may pass through the penta-plate assembly to the work piece. For this purpose, mirror 52 has an aperture into which is fitted a tube 56. The electrons from cathode 16 pass through tube 56 on their way down column 12 to work piece 34. As mentioned above, when the electrons strike the work piece they will, during a welding operation, vaporize a fine channel in the material. In order to protect the mirrors 50 and 52 of the penta-plate from being coated by vapors released from the work piece, there is provided a removable protective glass 58. Protective glass 58 has a hole therein which is aligned with the end of tube 56 to permit passage of the beam therethrough. When necessary, valve 39 may be closed and glass 58 changed merely by slipping it out of its receiving slot in frame 54 through an air-tight door, not shown, in the side of the beam column. In order to prevent the build up of static charges which might cause scattering or deflection of the focused beam, glass 58 is an electrically conducting material such as Nesa glass and both glass 58 and tube 56 are grounded.

The image of the work area reflected from the penta-plate assembly passes through a window 60 in the wall of beam column 12 and thence down optical column 40. The light path along which the image is projected is shown by a broken line in FIGURE 1. Window 60 is made of leaded glass so as to protect the operator from X-rays emanating from the work piece. The light rays reflected from the penta-plate are diverging. Referring now to FIGURE 3, this diverging light in traveling down optical column 40, first passes through an objective lens 62. The objective lens is a convex lens which bends the image and directs it toward a focal point, where an inverted image is formed. The now converging light next passes through a collector lens 64 which shortens the focal distance between the objective lens and the focal point. That is, the curvature of the collector lens is selected so that, regardless of the vertical positioning of the work piece, the inverted image will fall within a predetermined area along optical column 40.

The light next passes through an erector assembly 66 which is positioned beyond the image formed by the combination of the objective lens 62 and collector lens 64. Assembly 66 is an erector assembly, of a type well known in the art, that will turn the image right side up. The erector assembly 66 may be moved a limited distance along column 44 in order to focus the image on the reticle 68. As can be seen from FIGURE 4, the movement of erector assembly 66 is accomplished by turning a control knob 70 which is attached to a gear 72. Gear 72 in turn drives a rack 74 which is attached to erector 66. A key way 74 in the top of the erector is engaged by key 76 which is in turn attached to the wall of column 40. This key way arragement prevents unwanted rotation of assembly 66 and facilitates the movement thereof. The image appearing on reticle 68 is magnified by a plurality of lenses contained in an eye piece assembly 78. Eye piece assembly 78 may be adjusted, in a manner well known in the art, to permit optimum focusing for each individual operator.

Also located in optical column 40, between the erector assembly 66 and reticle 68, is a polarizing assembly 80. Assembly 80 comprises a pair of polarizing filters 82 and 84. Filter 84, as can be seen from FIGURES 3 and 5, is rotatable about the central axis of column 40. This rotation is accomplished by sliding a knob 86, which is attached to filter 84 by shaft 88 and plate 94 about the outside of column 40. For this purpose, a slot is provided in the wall of column 44 of such length to permit a 90° rotation of filter 84. Another feature of filter 80 is that it may be rotated about an axis perpendicular to the axis of column 40 in order to remove both filters 82 and 84 from the path of the image. This is accomplished by returning knob 86 to an initial position in the slot and then twisting said knob. As may be seen from FIGURES 3 and 6, filter 82 is attached to a rectangular support member 90 which is pivoted about a shaft 92 affixed to the bottom of column 40. Filter 84 is also affixed to a rectangular support member 94 which in turn is securely attached to shaft 88. When knob 86 is turned, member 94 will contact the filter 82 and will thus cause the bottom plate 90 to rotate about pivot 92. The foregoing arrangement provides infinitely variable illumination control over a wide range without impairing viewing quality even with minimum available illumination. In operation, filters 82 and 84 will be rotated out of the way prior to energization of the beam and the operator will initially position the work piece 34, for example by moving table 36, using the illumination provided by viewing lamp 44. When a welding or cutting operation is initiated, extremely high illumination will result from the operating electron beam striking the work piece. This illumination is much the same as that which occurs during an electric arc welding operation. Filters 82 and 84 are thus placed into position instantaneously by twisting knob 86 as soon as the electron beam generator is energized to permit the welding operation to be started. Filter 84 is then rotated in the manner described above to cut down the intensity of the light passing to the eye piece until optimum viewing conditions are achieved.

While the preferred embodiment of our invention has been shown and described, various modifications and substitutions may be made without deviating from the scope and spirit thereof. For example, it is known in the art to eliminate the work chamber and bring the beam out of the vacuum to atmospheric pressure. Our invention, without modification, may be used under such circumstances. Also, our invention may be used to view a work piece being operated upon by a laser which, of course, does not rely on vacuum operation. Further, while we have shown the viewing light positioned in the work chamber, it may be located at any place along the beam axis between the penta-plate and the work piece. We have, in fact, by incorporating a mirror set at 45° actually within the penta-plate assembly, illuminated the work area from a light source positioned at the same level as the penta-plate.

Thus, our invention is described by way of illustration rather than limitation and accordingly it is understood that our invention is to be limited only by the appended claims taken in view of the prior art.

We claim:

1. Apparatus for working materials with a highly energized beam comprising:
   means for generating a highly energized beam,
   a chamber containing at least a portion of said beam generating means,
   means for positioning a work piece generally in the line of said beam,
   means for focusing said beam on said work piece,
   apertured reflecting means positioned in said chamber between said beam generator and said work piece and having the aperture therein aligned with the beam axis,
   means located in the wall of said chamber for passing the image reflected by said reflecting means,
   an objective lens located outside of said chamber adjacent to said image passing means and having its optical axis at an angle to the beam axis,
   means aligned with the optical axis of said lens for magnifying the image of the work piece reflected by said reflecting means, and
   means for illuminating the region of the work piece being worked by the beam.

2. The apparatus of claim 1 wherein the reflecting means comprises a pair of mirrors arranged so as to perform the function of a penta-prism.

3. The apparatus of claim 2 wherein the optical axis of the objective lens is perpendicular to the beam axis.

4. The apparatus of claim 3 wherein the illuminating means comprises:
   a viewing light vertically positioned along but spacially removed from the beam axis between the reflecting means and the work piece, and
   means for directing the radiation emanating from said light against the region of the work piece being impinged upon by the beam.

5. The apparatus of claim 4 wherein the means for directing the radiation emanating from the viewing light comprises:
   a second objective lens for focusing the radiation from the viewing light, and
   second reflecting means for directing the focused radiation on the work piece.

6. The apparatus of claim 5 further comprising:
   means positioned between said objective lens and said magnifying means for controlling the intensity of the image passed to said magnifying means, and
   means for moving said intensity controlling means out of the light path between said lens and magnifying means.

7. Apparatus for working materials with an intense beam of charged particles comprising:
   means for generating an intense beam of charged particles,
   a column containing at least a portion of said beam generating means,
   means for maintaining a pressure less than atmospheric in said column,
   means for accelerating the generated beam down the column,
   means for positioning a work piece generally in the line of the beam where it exits from the column,
   means for focusing the beam on the work piece,
   apertured reflecting means positioned in said column between the beam generator and the work piece and having the aperture therein aligned with the beam axis,
   an objective lens located outside the column adjacent to said reflecting means,
   a transparent window located in the wall of said column between the objective lens and the reflecting means,
   means for magnifying the image of the work piece reflected by the reflecting means through the objective lens, and
   means for illuminating the region of the work piece to be worked by the beam.

8. The apparatus of claim 7 wherein the reflecting means comprises a pair of mirrors in a fixed relationship so as to function as a penta-prism.

9. The apparatus of claim 8 wherein the illuminating means comprises:
   a viewing light located outside of the column at a position along the beam axis between the reflecting means and the work piece, and
   means for directing radiation emanating from said light against the region of the work piece being impinged upon by the beam.

10. The apparatus of claim 9 wherein the means for directing the radiation emanating from the viewing light comprises:
    a second objective lens for focusing the radiation from the viewing light, and
    second reflecting means for directing the focused radiation on the work piece.

11. The apparatus of claim 10 further comprising:
    means positioned between said objective lens and said magnifying means for controlling the intensity of the image passed to said magnifying means, and
    means for moving said intensity controlling means out of the light path between said lens and magnifying means.

12. Apparatus for viewing a material to be worked in an evacuated chamber with a beam of electrons comprising:
    reflecting means having a plurality of reflecting surfaces positioned in said chamber adjacent to the axis of the beam for angularly reflecting an erect image of the material to be worked,
    light transparent means properly located in the wall of said chamber for passing the image reflected by said reflecting means,
    image magnifying means including an objective lens located outside of said chamber adjacent to said light transparent means for enlarging the image reflected by said reflecting means, and
    means for varying the focus of said magnifying means.

13. The apparatus of claim 12 wherein the reflecting means comprises:
    a first reflecting surface having the normal thereto at an angle to the incident light waves received thereby from the material to be worked, and
    a second reflecting surface arranged to receive as incident light waves the reflected waves from said first reflecting surface at an angle to the normal to said second surface.

14. The apparatus of claim 13 further comprising:
    means for illuminating the surface of the material to be viewed.

References Cited by the Examiner

UNITED STATES PATENTS

| | | | |
|---|---|---|---|
| 2,184,750 | 12/39 | Meinhardt et al. | 88—39 |
| 2,318,705 | 5/43 | Morgan | 88—39 |
| 2,750,835 | 6/56 | Nosco | 88—14 |
| 2,944,172 | 7/60 | Opitz et al. | |

OTHER REFERENCES

"The Electron Beam As a Production Tool," T. A. Moore, December 6–7, 1961.

RICHARD M. WOOD, *Primary Examiner.*

JOSEPH V. TRUHE, *Examiner.*